United States Patent
Komatsu

(10) Patent No.: US 9,928,598 B2
(45) Date of Patent: Mar. 27, 2018

(54) DEPTH MEASUREMENT APPARATUS, IMAGING APPARATUS AND DEPTH MEASUREMENT METHOD THAT CALCULATE DEPTH INFORMATION OF A TARGET PIXEL USING A COLOR PLANE OF WHICH A CORRELATION VALUE IS AT MOST A THRESHOLD

(71) Applicant: CANON KABUSHIKI KAISHA, Tokyo (JP)

(72) Inventor: Satoru Komatsu, Mansfield Center, CT (US)

(73) Assignee: Canon Kabushiki Kaisha, Tokyo (JP)

(*) Notice: Subject to any disclaimer, the term of this patent is extended or adjusted under 35 U.S.C. 154(b) by 189 days.

(21) Appl. No.: 14/921,125

(22) Filed: Oct. 23, 2015

(65) Prior Publication Data

US 2016/0125611 A1     May 5, 2016

(30) Foreign Application Priority Data

Oct. 31, 2014  (JP) ................................. 2014-223170
Sep. 2, 2015   (JP) ................................. 2015-172877

(51) Int. Cl.
*G06T 7/00*     (2017.01)
*G06K 9/00*    (2006.01)
(Continued)

(52) U.S. Cl.
CPC ............ *G06T 7/0065* (2013.01); *G01B 11/22* (2013.01); *G06K 9/00208* (2013.01); *G06K 9/2018* (2013.01); *G06K 9/4652* (2013.01); *G06K 9/6289* (2013.01); *G06T 7/521* (2017.01); *G06T 7/571* (2017.01); *G06T 2207/10024* (2013.01)

(58) Field of Classification Search
None
See application file for complete search history.

(56) References Cited

U.S. PATENT DOCUMENTS 8,711,215 B2    4/2014  Imamura
2012/0154355 A1  6/2012  Kawai et al.
(Continued)

FOREIGN PATENT DOCUMENTS

JP   2010-016743 A   1/2010
JP     5159986 B2    3/2013

*Primary Examiner* — Reza Aghevli
(74) *Attorney, Agent, or Firm* — Fitzpatrick, Cella, Harper & Scinto

(57) ABSTRACT

A depth measurement apparatus that calculates depth information of an object based on a first color image and a second color image. A depth calculator calculates depth information of a target pixel in a color plane, using the two color images. An evaluator calculates, for each color plane, an evaluation value to indicate a confidence coefficient of the depth information in the target pixel. The depth calculator (i) determines, based on the evaluation value, a color plane from which the depth information of the target pixel is calculated, (ii) calculates a correlation value in one color plane between the two color images, to calculate the depth information from the correlation value using a conversion table or a conversion formula that is different for each color plane, and (iii) calculates the depth information of the target pixel using a color plane of which a correlation value is a threshold or less.

19 Claims, 10 Drawing Sheets

(51) Int. Cl.

| | | |
|---|---|---|
| *G01B 11/22* | (2006.01) | |
| *G06K 9/46* | (2006.01) | |
| *G06T 7/521* | (2017.01) | |
| *G06T 7/571* | (2017.01) | |
| *G06K 9/20* | (2006.01) | |
| *G06K 9/62* | (2006.01) | |

(56) References Cited

U.S. PATENT DOCUMENTS

| | | | |
|---|---|---|---|
| 2012/0189195 A1* | 7/2012 | Paik | H04N 5/23212 |
| | | | 382/164 |
| 2013/0336577 A1* | 12/2013 | Lu | G06K 9/00 |
| | | | 382/154 |
| 2014/0210999 A1 | 7/2014 | Komatsu | |
| 2014/0218473 A1* | 8/2014 | Hannuksela | H04N 19/597 |
| | | | 348/43 |
| 2014/0333726 A1* | 11/2014 | Tokui | H04N 5/208 |
| | | | 348/46 |
| 2015/0042839 A1 | 2/2015 | Komatsu et al. | |
| 2015/0063681 A1* | 3/2015 | Bhardwaj | G06F 17/30277 |
| | | | 382/154 |
| 2015/0109514 A1 | 4/2015 | Komatsu | |
| 2015/0227815 A1 | 8/2015 | Komatsu | |
| 2015/0235103 A1 | 8/2015 | Komatsu et al. | |
| 2015/0245063 A1* | 8/2015 | Rusanovskyy | H04N 19/597 |
| | | | 375/240.12 |
| 2016/0171703 A1* | 6/2016 | Rhee | G06T 7/80 |
| | | | 382/154 |

\* cited by examiner

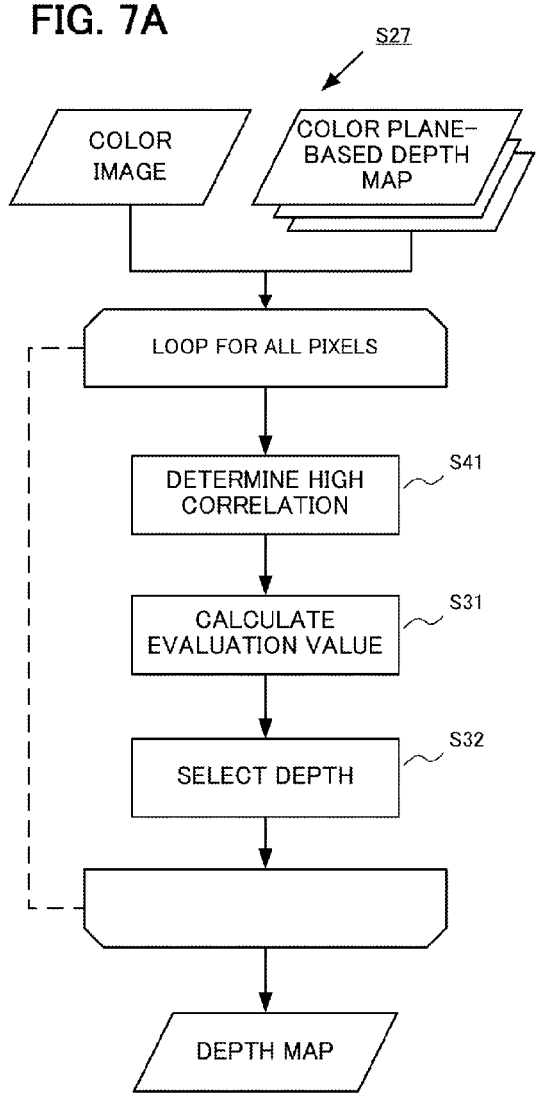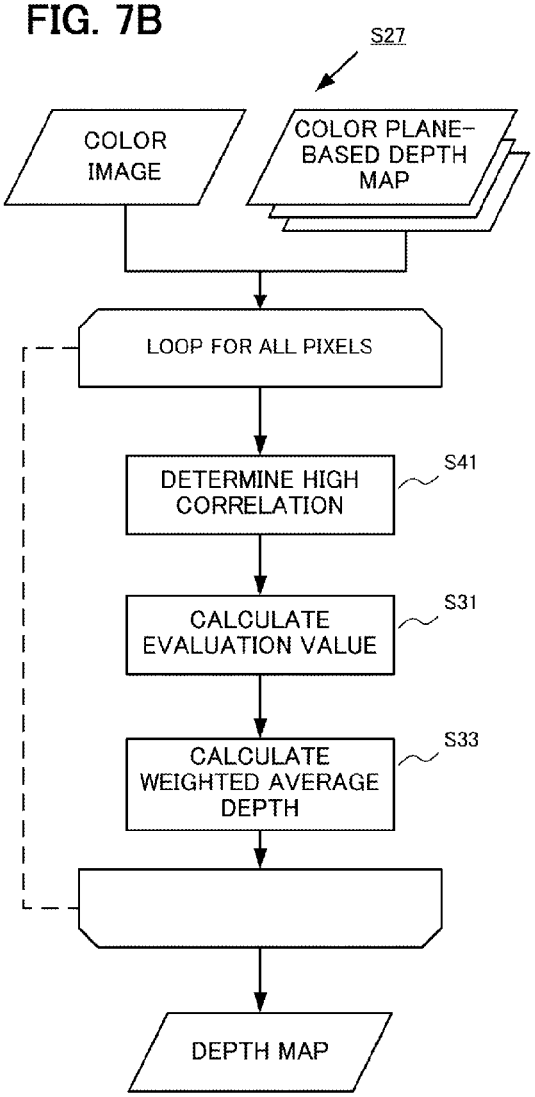

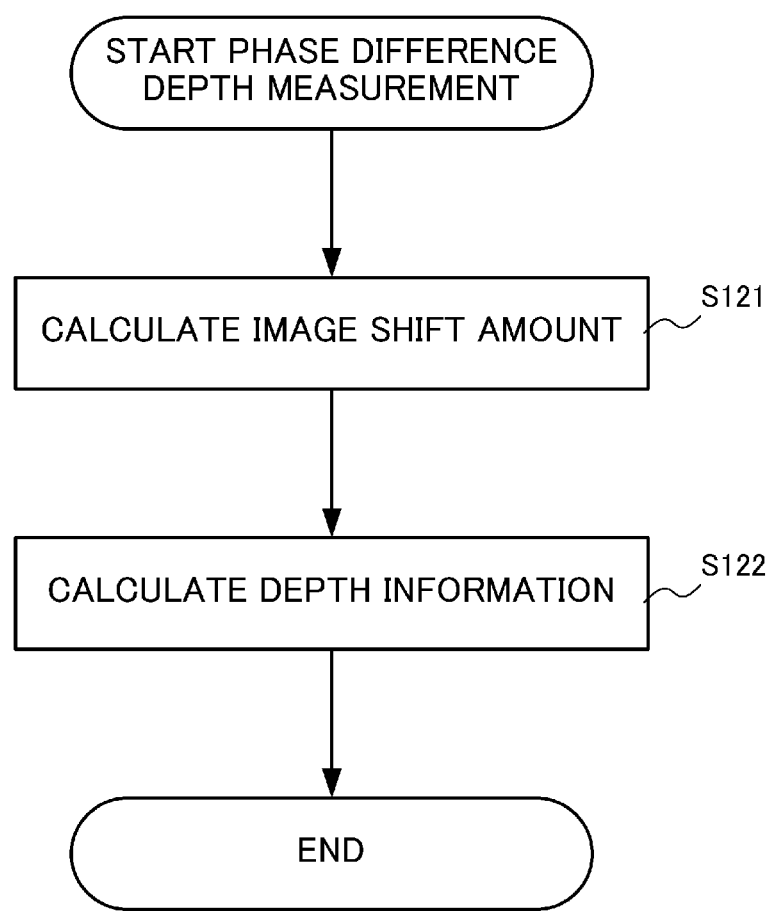

DEPTH MEASUREMENT APPARATUS, IMAGING APPARATUS AND DEPTH MEASUREMENT METHOD THAT CALCULATE DEPTH INFORMATION OF A TARGET PIXEL USING A COLOR PLANE OF WHICH A CORRELATION VALUE IS AT MOST A THRESHOLD

CLAIM OF PRIORITY

This application claims the benefit of Japanese Patent Application No. 2014-223170, filed on Oct. 31, 2014, and Japanese Patent Application No. 2015-172877, filed on Sep. 2, 2015, which are hereby incorporated by reference herein in their entirety.

BACKGROUND OF THE INVENTION

Field of the Invention

The present invention relates to a depth measurement apparatus.

Description of the Related Art

As a technique to acquire a depth of a photographed scene from an image acquired by an imaging apparatus, the Depth from Defocus (DFD) method as disclosed in Japanese Patent Application Laid-Open No. 2010-016743 (the '743 document) has been proposed. In the DFD method, a plurality of images having different degrees of blur is acquired by controlling the photographing parameters of an imaging optical system, and, in the plurality of acquired images, the degree of blur and correlation amount are calculated using the measurement target pixel and peripheral pixels thereof. The degree of blur and correlation amount change according to the depth of an object in the image. Therefore, the depth is calculated using these relationships. The depth measurement by the DFD method can be incorporated into a commercially available imaging apparatus, since the depth can be calculated using one imaging system, which is an advantage.

In order to measure the depth at a high precision, even if the object depth changes spatially, the '743 document proposes a depth measurement method in which a local region is selected in a photographed brightness image, and is weighted.

In Japanese Patent No. 5159986 (the '986 document), images based on different photographing parameters can be acquired by one-shot photographing by changing the optical system. It has also been proposed to measure the depth using brightness images having different colors depending on the depth of the object.

Another available method of acquiring a depth is a phase difference detection method that uses an image shift amount of images generated by luminous flux that passes through different pupil regions.

SUMMARY OF THE INVENTION

In the depth measurement based on the DFD method disclosed in the '743 document, the depth is calculated from the degree of blur of the photographed image, using the phenomenon in which the degree of blur caused by the imaging optical system changes in accordance with the depth to the object. According to the disclosed DFD method, the depth is measured using a brightness image, but if the brightness image was acquired by a monochrome imaging device, a brightness value of light, in which various wavelength components are mixed, is acquired. If the optical system has a longitudinal chromatic aberration, the depth measurement result disperses, since the degree of blur is different depending on the color (wavelength) of the object image. A similar problem is generated when a brightness image is acquired from an imaging device having a Bayer array by YUV conversion. Further, if a brightness image of a green pixel (G image) in a Bayer array is used, correct depth measurement cannot be performed if the object image does not include a green component. In concrete terms, the brightness of the G image drops, which drops the signal to noise (SN) ratio, making depth measurement impossible, or decreasing depth measurement accuracy. This problem is not limited to the case of using the DFD method, but also occurs when the phase difference detection method is used.

In the '986 document, the depth measurement range is expanded by measuring the depth for each color using the optical system that generated the longitudinal chromatic aberration, but the depth still cannot be measured depending on the color of the object.

With the foregoing in view, it is an object of the present invention to measure a depth stably and accurately, regardless of the color of the object.

A first aspect of the invention is a depth measurement apparatus that calculates depth information of an object based on a first color image and a second color image, which includes a depth calculator adapted to calculate depth information of a target pixel in a color plane, using the two color images, and an evaluator adapted to calculate, for each color plane, an evaluation value to indicate a confidence coefficient of the depth information in the target pixel. The depth calculator is further adapted to determine, based on the evaluation value, a color plane from which the depth information of the target pixel is calculated.

A second aspect of the invention is a depth measurement method executed by a depth measurement apparatus that calculates depth information of an object based on a first color image and a second color image. The method includes an evaluation value calculation step of calculating, for each color plane, an evaluation value to indicate a confidence coefficient of the depth information in a target pixel, and a depth calculation step of calculating the depth information of the target pixel using the depth information acquired from a color plane, which is determined based on the evaluation value.

According to the depth measurement method of the present invention, the depth can be measured stably and accurately, regardless of the color of the object.

Further features of the present invention will become apparent from the following description of exemplary embodiments with reference to the attached drawings.

BRIEF DESCRIPTION OF THE DRAWINGS

FIG. 7A and FIG. 7B are flow charts depicting a flow of a depth integration processing according to Embodiment 3;

FIG. 10 is a flow chart depicting a flow of a depth measurement processing according to Embodiment 4.

DESCRIPTION OF THE EMBODIMENTS

Embodiment 1

<System Configuration>

Figure 1:
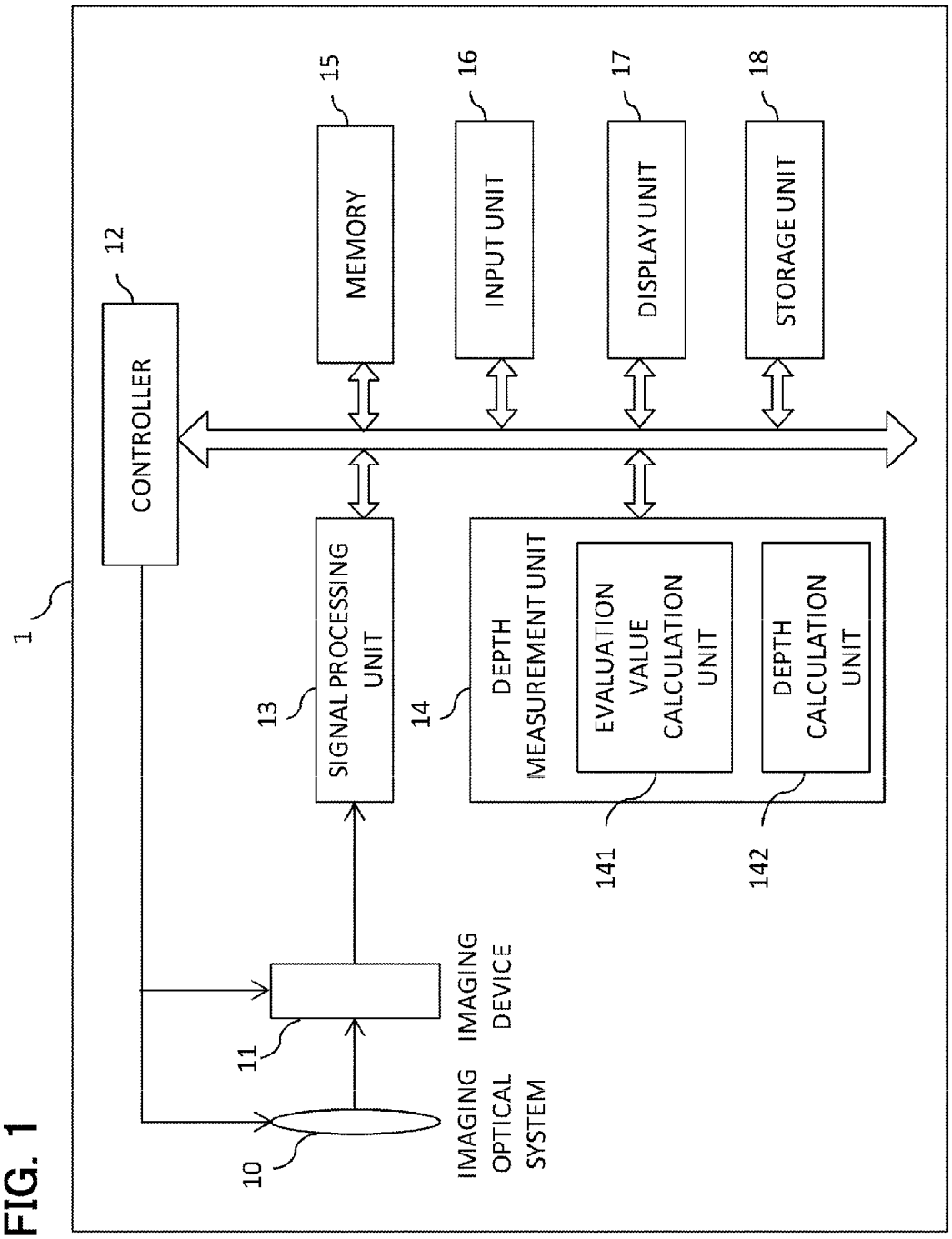
FIG. 1 is a diagram depicting a configuration of an imaging apparatus according to Embodiment 1.

FIG. 1 is a system block diagram depicting an imaging apparatus according to Embodiment 1 of the present invention. The imaging apparatus 1 has an imaging optical system 10, an imaging device 11, a control unit 12, a signal processing unit 13, a depth measurement unit 14, a memory 15, an input unit 16, a display unit 17, and a storage unit 18.

The imaging optical system 10 is an optical system that is constituted by a plurality of lenses, and forms an image of incident light on an image plane of the imaging device 11. For the imaging optical system 10, a variable-focus optical system is used, which can automatically focus using an auto focusing function of the control unit 12. The auto focusing method may be a passive type or an active type.

The imaging device 11 is an imaging device having a CCD or a CMOS, and acquires a color image. The imaging device 11 may be an imaging device having a color filter, or may be an imaging device having three different colored plates. The imaging device 11 of this embodiment acquires a color image generated with three colors, RGB, but may be an imaging device that acquires a color image generated with three or more colors, including invisible light.

The control unit 12 is a functional unit that controls each unit of the imaging apparatus 1. The functions of the control unit 12 include, for example, auto focusing using auto focus (AF), changing the focus position, changing the F number (aperture), loading an image, controlling a shutter and flash (neither illustrated), and controlling the input unit 16, the display unit 17, and the storage unit 18.

The signal processing unit 13 is a functional unit that processes a signal output from the imaging device 11. The concrete functions of the signal processing unit 13 include an A/D conversion of an analog signal and noise removal, demosiacing, brightness signal conversion, aberration correction, white balance adjustment, and color correction. The digital image data output from the signal processing unit 13 is temporarily stored in the memory 15, and is then displayed on the display unit 17, recorded (saved) in the storage unit 18, or output to the depth measurement unit 14, where a desired processing is executed.

The depth measurement unit 14 is a functional unit that calculates the distance to an object in the depth direction in the image. The depth measurement unit 14 includes an evaluation value calculation unit 141 and a depth calculation unit 142. The evaluation value calculation unit 141 has a function to determine an evaluation value that indicates a confidence coefficient of the depth calculation for each color plane of the color image. The depth calculation unit 142 has a function to calculate a depth from each of the color planes of the color image, and a function to calculate the final depth based on the depth in each color plane and the evaluation value. A detailed operation of the depth measurement unit 14 will be described later.

The input unit 16 is an interface to input information to or to change the setting of the imaging apparatus 1 by a user. For example, a dial, a button, a switch, a touch panel, or the like, can be used.

The display unit 17 is a display unit constituted by a liquid crystal display, an organic EL display, or the like. The display unit 17 is used to check composition for photographing, to view a photographed or recorded image, and to display various setting screens and message information.

The storage unit 18 is a nonvolatile storage medium that stores photographed image data, parameter data used for the imaging apparatus 1, or the like. For the storage unit 18, it is preferable to use a large capacity storage medium that can be read and written at high-speed. For example, a flash memory can be suitably used.

<Object Depth Measurement Method>

Figure 2:
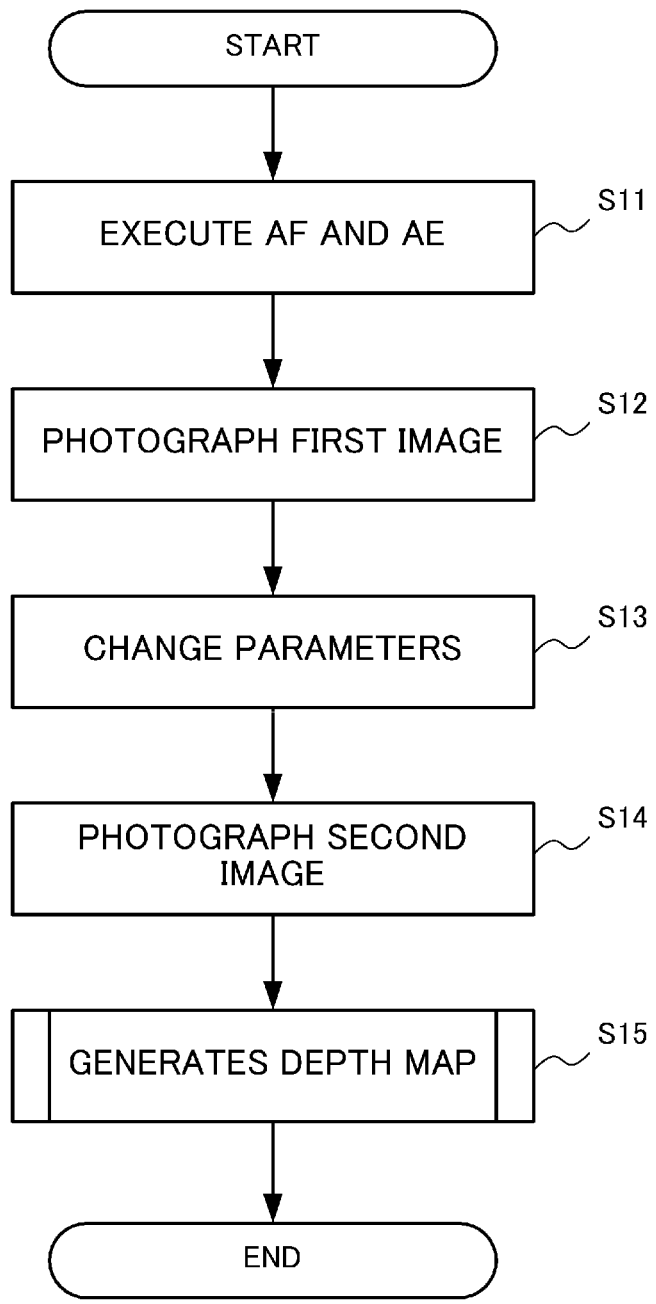
FIG. 2 is a flow chart depicting a flow of a depth measurement processing according to Embodiment 1.

The depth measurement processing executed by the imaging apparatus 1 will be described next in detail, with reference to FIG. 2, which is a flow chart depicting the processing flow.

When the user operates the input unit 16 to instruct the execution of the depth measurement and to start photographing, the photographing is executed after auto focusing (AF), and auto exposure control (AE) are executed, and the focus position and aperture (F number) are determined (step S11). Then, photographing is executed in step S12, and the image is loaded from the imaging device 11.

When the first photographing completes, the control unit 12 changes the photographing parameters (step S13). The photographing parameters to be changed are at least one of the aperture (F number), the focus position, and the focal length. For a value of a parameter, a value saved in advance may be read and used, or a value determined based on the information input by the user may be used. When the change of the photographing parameters completes, the processing moves to step S14, and the second photographing is executed.

In this embodiment, the focus position is changed, then the second image is photographed. For example, the first image is photographed so that the main object is focused on, and the second image is photographed after changing the focus position, so that the main object blurs.

To photograph a plurality of images, the influence of camera shake and object shake is lessened as the shutter speed is faster and the photographing interval is shorter. Therefore, in order to measure the depth at a higher precision, it is preferable that the shutter speed is faster and the photographing interval is shorter. However, if sensitivity is increased to make the shutter speed faster, the influence of noise becomes more conspicuous than the influence of camera shake in some cases. Hence, the shutter speed must be set appropriately, considering sensitivity.

When the two images are photographed, the photographed images are processed by the signal processing unit 13, respectively, so that the photograph images become images suitable for the depth measurement, and are temporarily stored in the memory 15. In concrete terms, development processing is performed, but edge enhancement processing, or the like, should be avoided, so that blur is not changed by the signal processing. The images to be used in subsequent processing are assumed to be RGB images, in the case of color images, generated by demosaicing or selecting pixels only for a specific color from a Bayer array. The R image, G image, and B image are the color plane images in this embodiment. At least one of the two photographed images may be signal-processed as an image for viewing, and stored in the memory 15.

In step S15, the depth measurement unit 14 accepts, as an input, two color images for depth measurement stored in the memory 15, and calculates the depth map from these color images. The depth map is data indicating the distribution of object depths in the image. The object depth may be expressed as an absolute depth from the imaging apparatus to the object, or may be expressed as a relative depth from the focus to position to the object. The object depth may be expressed as an object depth or may be expressed as an image depth. Further, a value that can be converted into the depth, such as a degree of blur and a correlation amount, may be used as the object depth (depth information). The calculated distribution of the object depth (depth map) is displayed by the display unit 17, and is saved in a recording unit 19.

Figure 3:
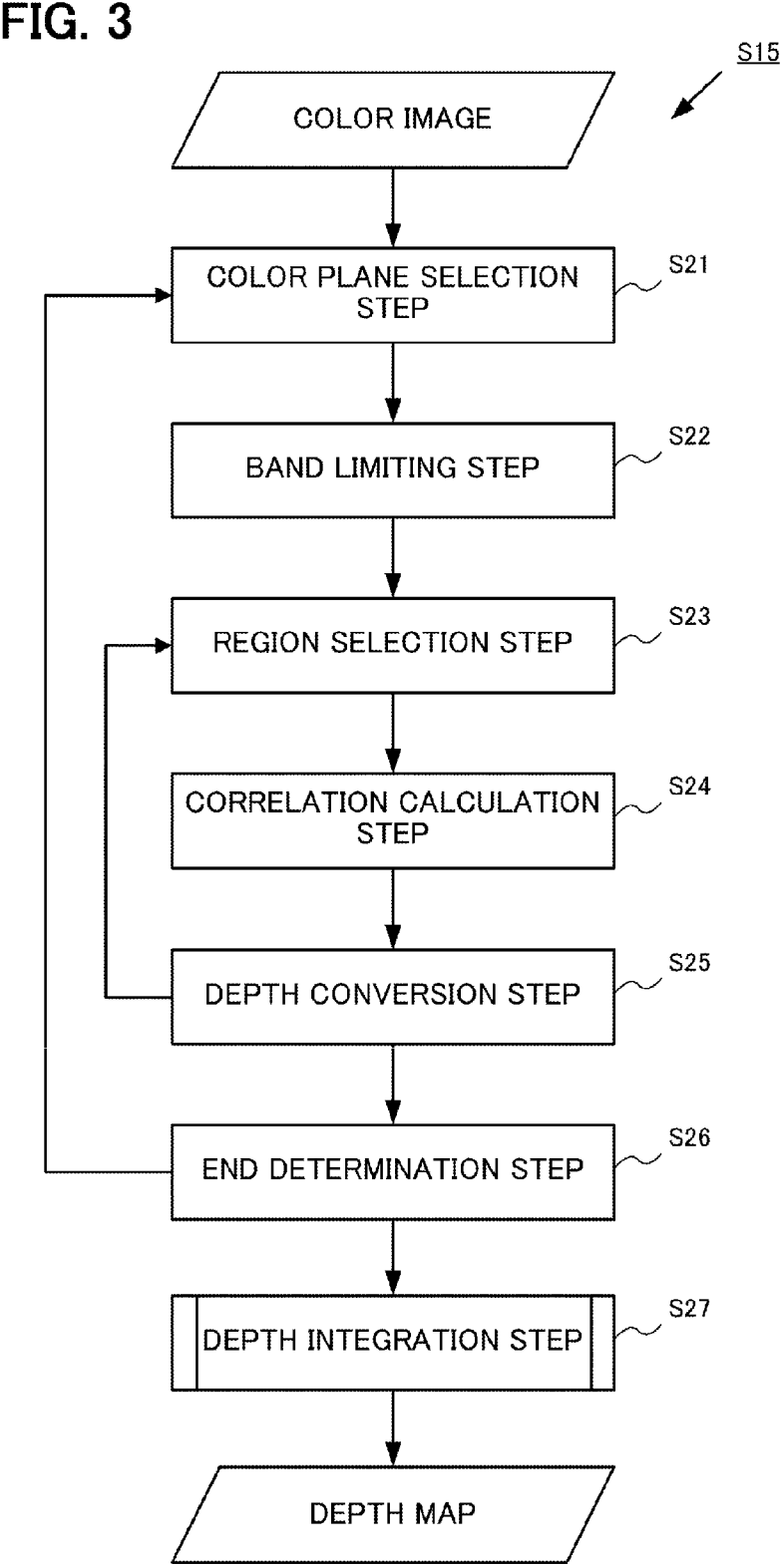
FIG. 3 is a flow chart depicting a flow of a depth map generation processing according to Embodiment 1.

Now, the processing executed by the depth measurement unit 14 in step S15 (hereafter, "depth map generation processing") will be described in detail. FIG. 3 is a flow chart depicting the flow of the depth map generation step S15 according to this embodiment.

When the two color images are received, the depth measurement unit 14 selects the color plane images having the same color from the two color images in the color plane selection step S21. The processings in steps S22 to S25 are executed for all of the color planes. Hence, the selection sequence of the color planes in step S21 is not especially limited.

In the band limiting step S22, the depth calculation unit 142 executes the filtering processing for the generated two color plane images, so that a desired spatial frequency band is extracted, and generates the band-limited color plane images. The change of blur is different depending on the spatial frequency. Therefore, in the band limiting step S22, only the target frequency band is extracted so as to perform stable depth measurement. A method of extracting the spatial frequency band is not limited, such as by converting into a frequency space or using filters. It is preferable to pass low to mid-band frequencies, since the influence of noise is high in a high frequency band.

In the region selection step S23, the depth calculation unit 142 selects target pixels in the same coordinate positions in the two band-limited color plane images, and the peripheral local regions thereof. The target pixel and local region are set throughout the image by shifting one pixel at a time. Then, the following processing is performed, whereby the depth image (depth map) of the entire input image can be calculated. The depth map need not always be the same number of pixels as the input image, and may be calculated for each of several pixels of input image. The local region may be set by using one or more pre-specified regions, or the user may specify the range using the input unit 16.

In the correlation operation step S24, the depth calculation unit 142 calculates the correlation of the local region of the first image and the local region of the second image, selected in the region selection step S23 using Expression 1.

[Math. 1]

$$NCC_j = \frac{\sum (I_1 - \overline{I_1})(I_{2,i} - \overline{I_{2,i}})}{\sqrt{\sum (I_1 - \overline{I_1})^2 \sum (I_{2,i} - \overline{I_{2,i}})^2}} \quad \text{(Expression 1)}$$

Here $NCC_j$ denotes a correlation value in a local region centering around the target pixel j, $I_{1,i}$ denotes a pixel value at a pixel position i in one of the color plane images, and $I_{2,i}$ denotes a pixel value at the pixel position i in the other color plane image. The pixel values are summed up for the local region centered around the target pixel j. $I_1$ and $I_2$ with an over bar indicate average values of the pixels in the local region in the color plane images, respectively.

If the degree of blur after defocusing is the same before and after focusing without aberration, the blur becomes similar in the mid-point of the two focus positions of the images photographed with moving the focus on the image side, and the correlation value at this position is highest. As the position moves away from the mid-position, the degree of blur of the two images become different, and correlation decreases. In other words, as the position is away from the position where the degree of blur of the two images is the same, which is the peak, correlation decreases. The correlation value becomes a value according to the blur generated by defocusing. Therefore, if the correlation value is known, the corresponding defocus amount can be known, and the relative depth can be calculated.

Figure 4:
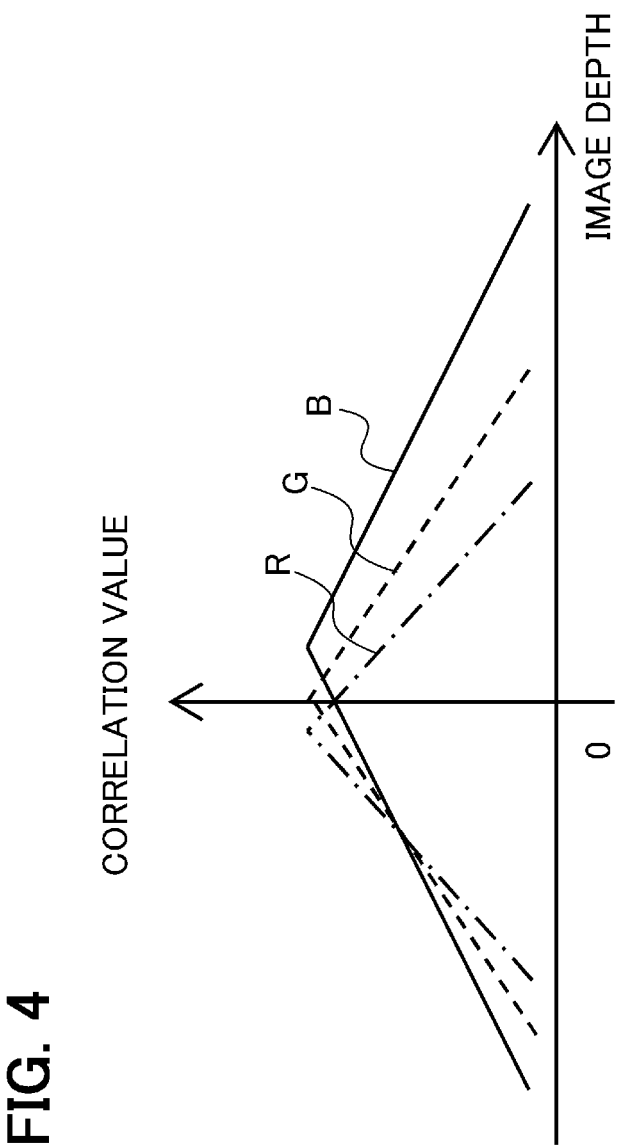
FIG. 4 is a diagram depicting a difference of a correlation value depending on the color plane.

In the depth conversion step S25, the depth calculation unit 142 converts the correlation value calculated in the correlation operation step S24 into the image depth. FIG. 4 shows the relationship between the correlation value and the image depth. The inclination of the defocus characteristic of the correlation value and the position where the correlation value becomes maximum differ depending on the color plane. The inclination is generated by the difference of the depth depending on the wavelength, and the shift of the focus position is generated by the longitudinal chromatic aberration. Therefore, the depth calculation unit 142 holds the conversion table or conversion formula to convert from the correlation value into the image depth for each color plane, and converts the correlation value into the image depth using a different conversion for each color plane. The conversion table or the conversion formula is determined by measurement in advance, or by simulation using the optical design information. In the case of simulation, the result of simulation using the central wavelength for each color filter or wavelength having the highest transmittance as the representative wavelength is applied for the conversion table or the conversion formula for each color plane. To determine the representative wavelength, the center of gravity wavelength may be determined and used based on a wavelength in the color filter and transmittance thereof. Even for objects located at the same depth, different correlation values are calculated depending on the color plane, but an image depth that does not depend on the color plane is acquired in the depth conversion step S25.

In this embodiment, Expression 1 was described as an example of the calculation method, but the calculation method is not limited to Expression 1 if the relationship of degrees of blur between two color planes can be determined. If the relationship between the output value and the focus position on the image plane depending on the calculation is known, this relationship can be converted into the relative depth.

An example of other calculation methods is Expression 2 shown below.

[Math. 2]

$$G_j = \frac{\sum_i (I_{1,i} - I_{2,i})}{\sum_i (\nabla^2 I_{1,i} + \nabla^2 I_{2,i})} \quad \text{(Expression 2)}$$

Expression 3 is an example of the depth calculation operation when Fourier transform is performed and evaluated in the frequency space.

[Math. 3]

$$D_j = \frac{F(I_1)}{F(I_2)} = \frac{OTF_1 \cdot S}{OTF_2 \cdot S} = \frac{OTF_1}{OTF_2} \quad \text{(Expression 3)}$$

Here, F denotes a Fourier transform, OTF denotes an optical transfer function, and S denotes a Fourier transform result in the photographed scene. In Expression 3, the ratio of the optical transfer functions under the two photographing conditions is acquired, and the change of this value due to the defocus can be known from the optical system design data in advance. Hence, the change of this value due to the defocus can be converted into the relative depth.

When the depth conversion step S25 ends, processing returns to the region selection step S23, and the above-mentioned processing is repeated for an unprocessed target pixel. The region selection step S23 and the correlation operation step S24 are repeatedly executed until the operation for the specified region or entire image completes. By this repeat processing, the depth map can be generated for one color plane. When the depth conversion step S25 ends for all of the local regions, the processing moves to the end determination step S26.

In the end determination step S26, the depth calculation unit 142 determines whether processing is completed for all of the color planes included in the color images. If there remains a color plane that is not processed, processing returns to the color plane selection step S21, and processing up to the depth conversion step S25 is repeated. When the depth map is generated for all of the color planes, processing moves to the depth integration step S27.

Figure 5A:
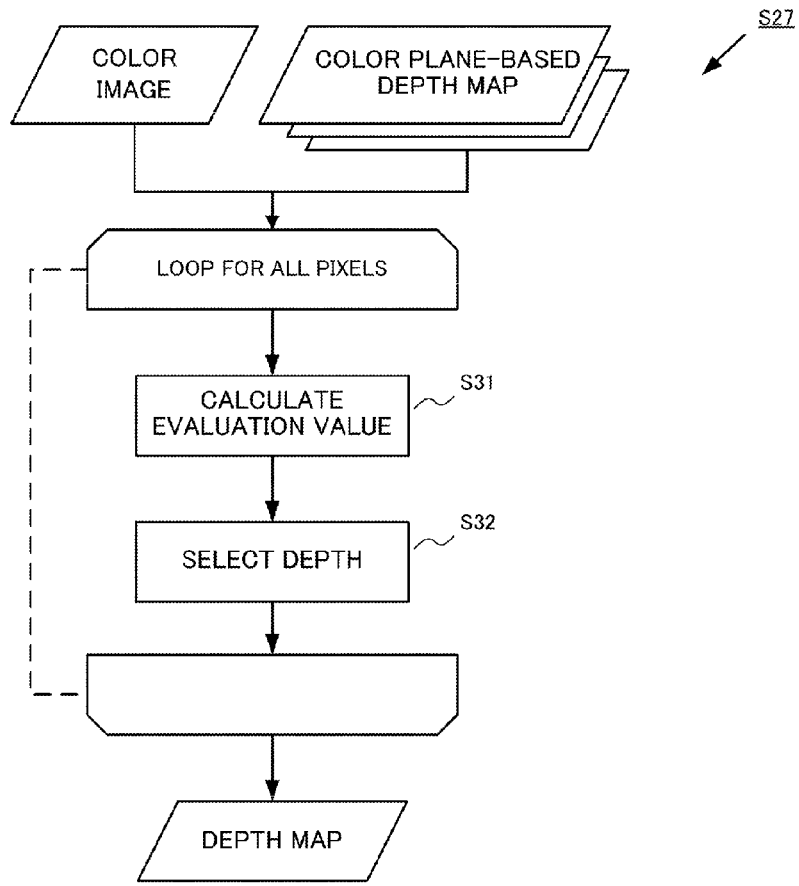
FIG. 5A and FIG. 5B are flow charts depicting a flow of a depth integration processing according to Embodiment 1.

In the depth integration step S27, the depth measurement unit 14 selects a depth of a color plane having a high confidence coefficient for each pixel, from the depth maps of the plurality of color planes calculated in the depth conversion step S25, and generates a final depth map. The flow chart in FIG. 5A shows details of the depth integration step S27.

The evaluation value calculation unit 141 calculates, for each color plane, an evaluation value to indicate the confidence coefficient of the depth information in the target pixel of the depth map (S31). In this embodiment, a brightness value for each color plane, before correcting the transmittance of the color filter, is used as the evaluation value. The color plane image for which the evaluation value is calculated may be a color plane image of either one of the two color images, or a color plane image of a color image generated by combining the two color images.

The depth calculation unit 142 selects, as the depth in the target pixel, a depth in the color plane having the highest evaluation value (S32). This is because a highly accurate depth measurement result with good signal to noise (SN) ratio can be acquired if a color plane having a high brightness value is used.

By executing the above-mentioned evaluation value calculation step S31 and the depth selection step S32 for all of the pixels of the depth map, one depth map, in which each depth map calculated for each color plane is integrated, is generated.

In the flow chart in FIG. 5A, processings in the evaluation value calculation step S31 and the depth selection step S32 are executed for each pixel, but the depth selection step S32 may be executed for all of the pixels after the evaluation value calculation processing is executed for all of the pixels. The timing to determine the evaluation value may be any timing before the depth selection step S32.

Figure 5B:
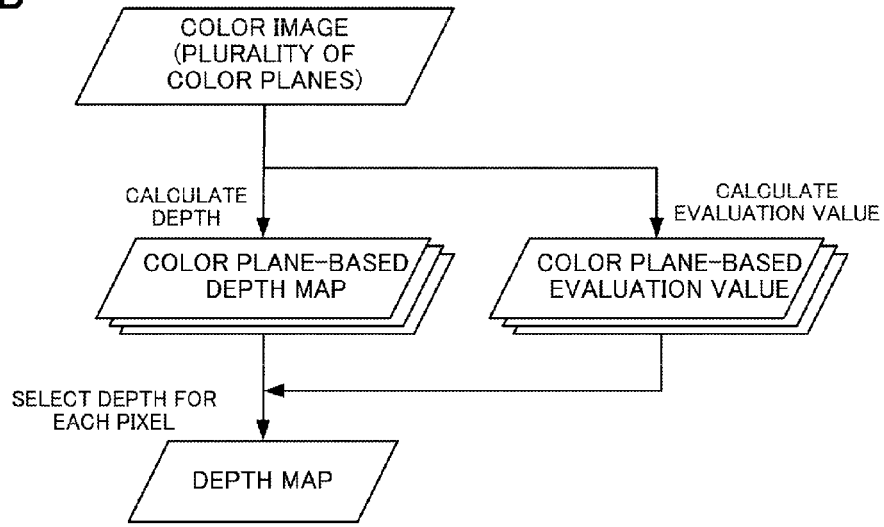

FIG. 5B is a diagram depicting the data flow in the depth map generation step S15 of this embodiment. From the color image constituted by a plurality of color planes, the depth calculation unit 142 generates a depth map, including the depth information of each pixel, for each color plane (S21 to S26). Further, from the color image constituted by a plurality of color planes, the evaluation value calculation unit 103 calculates an evaluation value to indicate a confidence coefficient of the depth information of each pixel for each color plane (S31). Then, the depth calculation unit 142 determines, for each pixel, a color plane from which depth information to generate a final depth map is acquired, based on the evaluation value (S32).

Here, another calculation method for the evaluation value will be described. For the evaluation value, an average value of the brightness values (before correcting the transmittance of the color filter) in the peripheral region centering around the target pixel may be used. The size of the peripheral region here may be the same size as the local region used for the depth calculation (selected in step S23), or may be a different size from this size. For the evaluation value, the brightness value in the target pixel or an averaged brightness value of the peripheral region of the target pixel, after the transmittance of the color filter and white balance are corrected, may be used. For another example, the number of pixels, which satisfy the condition that the brightness value is a threshold or more, in the peripheral region in the band-limited color plane image, may be used. The threshold here is preferably set to a brightness value such that reliable depth calculation can be implemented if the brightness value exceeds this threshold value.

The depth information included in the depth map output by the depth measurement unit 14 may be represented as a relative depth from the focus position, or an object depth (absolute depth) generated by converting the acquired relative depth using the focal length and the focus depth on the object side.

In this embodiment, the depth information is calculated from a plurality of color planes, and the depth information of the most reliable (having the highest evaluation value) color plane is selected. In the case of the method of the prior art, which calculates the depth based on a color plane having a specific color, depth cannot be measured accurately in a region where this color component is weak, but if this embodiment is used, the depth can be measured accurately, regardless of the color of the object image. Moreover, in the case of the method of the prior art that calculates the depth using the brightness image generated from an image having a plurality of colors, a brightness value of the plurality of colors that are mixed is acquired, and a different correlation value is acquired depending on the color because of the longitudinal chromatic aberration. Hence, the depth cannot be measured accurately. However, in this embodiment, the depth is measured for each color plane. Hence, even if the optical system has a longitudinal chromatic aberration, depth can be measured accurately. Therefore, according to this embodiment, the robustness of the object color and the depth measurement accuracy can be improved.

Embodiment 2

Figure 6:
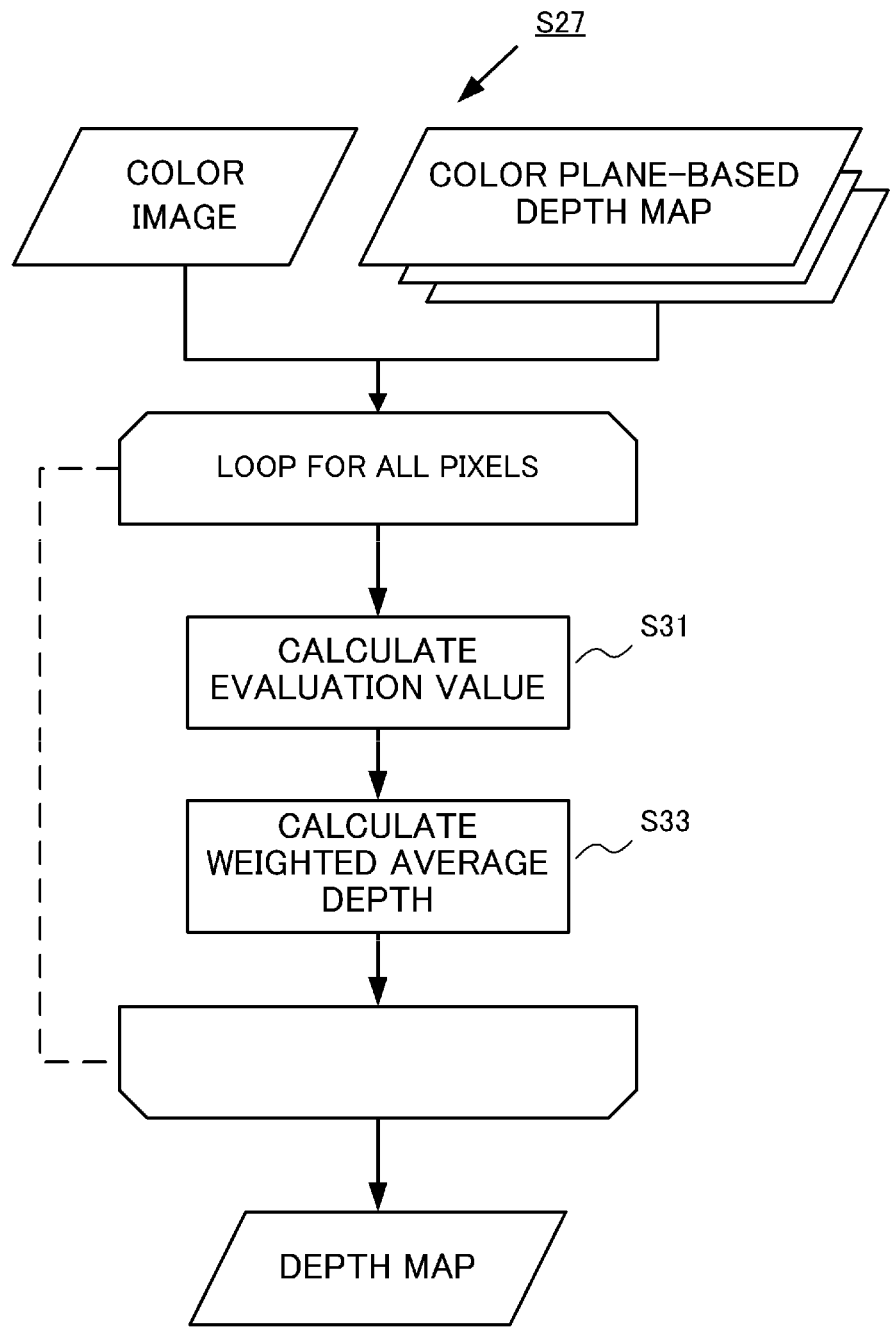
FIG. 6 is a flow chart depicting a flow of a depth integration processing according to Embodiment 2.

Embodiment 2 of the present invention will be described next. A difference of Embodiment 2 from Embodiment 1 is the method of integrating depth, which is calculated for each color plane (S27). The configuration of the imaging apparatus 1 is the same as that in Embodiment 1. Hence, the same reference symbols are used for the description. Primary differences in processing from Embodiment 1 will be described herein below. FIG. 6 is a flow chart depicting the flow in the depth integration step S27 in Embodiment 2.

The evaluation value calculation step S31 is the same as that in Embodiment 1. Various values described in Embodiment 1 can be used for the evaluation value. A case when the brightness value for each color plane, before correcting the transmittance of the color filter is used for the evaluation value, will be described below.

In this embodiment, the depth in the target pixel is not determined to be the depth calculated from one color plane, but is determined as the weighted average value of the depths calculated from a plurality of color planes. The weight of the depth for each color plane in the weighted average is determined according to the evaluation value in each color plane. The depth calculation unit 142 calculates a weight for the weighted averaging in the weighted average depth calculation step S33 using the evaluation value (brightness value in this case) for each color plane in the target pixel first. If the color image is an RGB image, the weight W of each color plane is calculated by the ratio of the brightness value, as shown in Expression 4.

[Math. 4]

$$W_{Ri} = \frac{R_i}{R_i + G_i + B_i}, W_{Gi} = \frac{G_i}{R_i + G_i + B_i},$$
$$W_{Bi} = \frac{B_i}{R_i + G_i + B_i}$$

(Expression 4)

Here, $W_R$, $W_G$, and $W_B$ denote the weights of each color plane, and R, G and B denote the brightness values of each color plane. Subscript i indicates the target pixel.

The depth calculation unit 142 executes the weighted averaging for the depth map of each color plane using the calculated weight. The depth calculation unit 142 determines the weighted average value of the depth calculated like this, as the final depth information in the target pixel. The depth calculation unit 142 executes the integration processing using the above-mentioned weighted averaging for all of the pixels of the depth map, and outputs the integrated depth map.

In the above example, the weighted averaging processing using the brightness value as the evaluation value was described, but it is obvious that the weighted averaging processing can be executed using the same method, even if the evaluation value is not the brightness value. In concrete terms, R, G, and B of Expression 2 are regarded as the evaluation values in respective color planes, and the weighted averaged value is determined as the final depth using the ratio of the evaluation values as the weight.

The depth information calculated in the depth conversion step S25 is the image depth, and, in the case of the relative depth with respect to the focus position, the depth information to be used for the weighted averaging may be determined, considering the sign of the depth value. To be more specific, the depth calculation unit 142 calculates the weighted average depth value using only the depth information having a high number of relative depths of which signs are the same, with respect to the focus position, out of the depth information acquired using respective color planes in step S33. For example, if the color planes are three colors, R, G, and B, and the relative depths acquired from the color planes R and G are positive, and the relative depth acquired from the color plane B is negative, then the weighted average depth value is calculated using only the depth information acquired from the color planes R and G. In this case, the weight is determined based on the evaluation value of the color plane used for the weighted averaging. This is the same even if the number of color planes is more than three.

By executing the weighted averaging considering the sign of the relative depth, generation of an error upon integrating the depth values in the weighted averaging can be prevented, even if the signs are changed due to an error included in the depth calculated near the focus position. Furthermore, if the sign is inverted by noise, or the like, in a depth distant from the focus position, incorrect signs are included upon integrating the depth values, which drops accuracy considerably. By considering the signs when the evaluation values are calculated like this, a drop in accuracy upon integrating the depth values by the weighted averaging can be prevented.

If the number of color planes is an even number, and the number of color planes having positive depth values and the number of color planes having the negative depth values are the same, then the following processing can be performed. For example, either one of the positive and negative signs is selected, and the weighted average can be determined using only the depth information having the selected sign. In this case, the sign of the relative depths, of which average value or maximum value of the evaluation values is greater, may be selected. In either case, it is preferable to add such information as "confidence coefficient of the calculated depth is low".

According to this embodiment, the depth step difference in the boundary between different color planes, of which depths are selected in the depth integration processing, due to an error generated by the depth conversion error in each color plane, can be lessened by using the weighted averaging. Further, if a sign error of an image depth is generated due to noise or depth conversion error, the depth error during integration can be decreased by performing the weighted averaging using only the depth values having the same sign.

Embodiment 3

Embodiment 3 of the present invention will now be described. A difference of Embodiment 3 from Embodiment 1 and Embodiment 2 is that the correlation values determined during the depth calculation are considered in the method for integrating the calculated depth values for each color plane (S27). The configuration of the imaging apparatus 1 in Embodiment 3 is the same as that in Embodiment 1 and Embodiment 2. Therefore, the same reference symbols are used for the description. Primary differences of the processing from Embodiment 1 and Embodiment 2 will be described below.

FIG. 7A and FIG. 7B are flow charts depicting the flow of the depth integration step S27 in this embodiment. FIG. 7A shows an example of processing based on Embodiment 1, and FIG. 7B shows an example of processing based on Embodiment 2.

In this embodiment, the depth information of a color plane having a high correlation value, when the depth is calculated for each color plane (see step S24 in FIG. 3, Expression 1, and the like), is not used for the depth integration processing. In regions where the degree of blur is similar, the correlation value is high, but may drop significantly due to noise. Therefore, an error of depth acquired by the depth conversion table or the conversion formula that is held in advance may become significant. Thus, the depth measurement error becomes high if the correlation value is high. Hence, the depth calculation can be improved by not using the depth acquired from the high correlation value for the depth integration.

Here, if the longitudinal chromatic aberration remains in the optical system, the object depth to have high correlation differs depending on the color plane. This means that even if correlation is high in one color plane, correlation may not be high in another color plane. Therefore, at least one of the color planes has a reliable correlation value that can be used for depth measurement.

In a high correlation determination step S41, the evaluation value calculation unit 141 determines whether the correlation value calculated for each color plane is greater than a predetermined threshold. This threshold is a value based on the assumption that if a correlation value is higher than this threshold, the depth calculation error becomes large due to the influence of noise. In the evaluation value calculation step S31, the evaluation value calculation unit 141 sets the evaluation values to zero (minimum value) for the color plane that was determined that the correlation value is greater than the predetermined threshold. Then, using the evaluation value determined like this, the depth calculation unit 142 executes a depth selection step S32 and a weighted average depth calculation step S33. The processings in these steps are the same as those in Embodiment 1 and Embodiment 2. In this embodiment, the evaluation values are determined as above. Hence, the depth information of the target pixel can be calculated using the depth information acquired from the color plane, of which the correlation value is the threshold or less.

A similar effect is acquired by calculating the evaluation values themselves in the same manner as those in Embodiment 1 and Embodiment 2, and by not using depth information, of which correlation values are greater than the threshold in the depth selection step S32 and in the weighted average depth calculation step S33.

According to this embodiment, the depth information can be calculated accurately even in the high correlation region. As mentioned above, in the case when the optical system has the longitudinal chromatic aberration, even if correlation is high in one color plane, correlation is not high in another color plane. In this embodiment, the final depth map is generated based on the information acquired from a color plane where a drop in depth measurement performance due to noise does not occur very much. Hence, a drop in accuracy can be prevented.

Embodiment 4

In Embodiment 4 of the present invention, a color plane to be used for the depth measurement is determined for each pixel, and the depth is calculated only for the color plane to be used. A difference from Embodiment 1 is that the depth is not calculated for all of the color planes.

Figure 8:
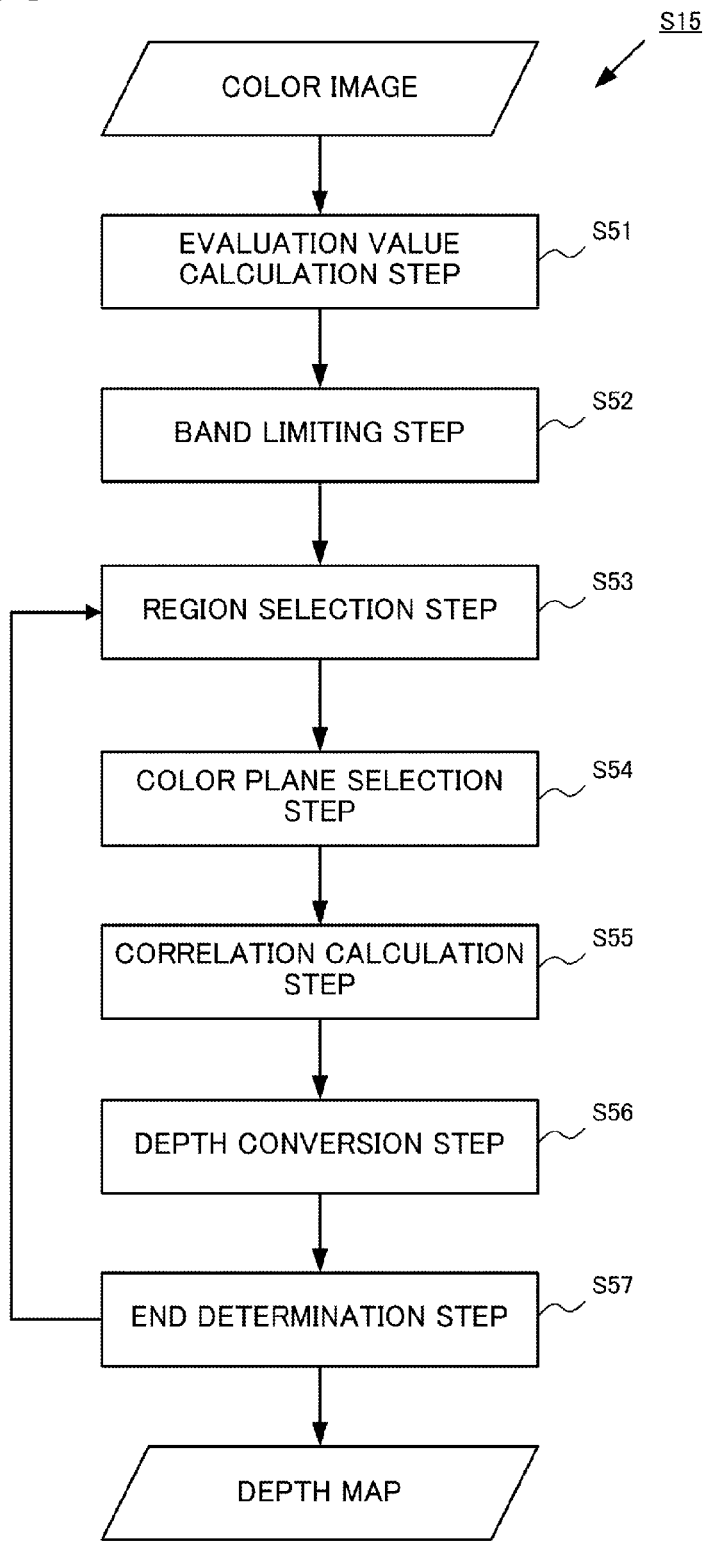
FIG. 8 is a flow chart depicting a flow of a depth map generation processing according to Embodiment 4.

The configuration of an imaging apparatus 1 according to Embodiment 4 is the same as that in Embodiment 1. The difference from Embodiment 1 will now be described. FIG. 8 is a flow chart depicting the flow of the depth map generation step S15 according to Embodiment 4.

If a color image is input to the depth measurement unit 14, the evaluation value calculation unit 141 executes an evaluation value calculation step S51. The evaluation value calculation step S51 is a processing to calculate the evaluation value for each color plane and each pixel, just like the evaluation value calculation step S31 (FIG. 5A) of Embodiment 1. In concrete terms, various values described in Embodiment 1, such as the brightness value in each color plane, can be used for the evaluation values.

Then, the depth calculation unit 142 executes a band limiting step S52 and a region selection step S53 for the input color image. These processings are the same as the band limiting step S22 and the region selection step S23 of Embodiment 1.

In a color plane selection step S54, the depth calculation unit 142 selects a color plane to be used for the depth measurement in the target pixel based on the evaluation values calculated in the evaluation value calculation step S31. In concrete terms, the depth calculation unit 142 determines that a color plane having the highest evaluation value in the target pixel will be used for the depth measurement.

The depth calculation unit 142 executes a correlation operation step S55 and a depth conversion step S56 for the selected color plane. These processings are the same as the correlation operation step S24 and the depth conversion step S25 of Embodiment 1. Therefore, a description thereof is omitted. If the correlation value calculated in the correlation operation step S55 is greater than a predetermined threshold, the correlation value operation may be executed again using the next greatest evaluation value, in order to acquire an effect similar to that in Embodiment 3.

In an end determination step S57, it is determined whether processing is completed for all of the pixels of the depth map. The processings from the region selection step S53 to the depth conversion step S56 may be repeated until processings are completed for all of the pixels. When the depth is calculated for all of the pixels, processing is ended, and the depth map is output.

A similar depth map is generated even if the sequence of the region selection processing and color plane selection processing is reversed. In concrete terms, a color plane is selected first. Then, the depth information is calculated for a pixel having the highest evaluation value in the color plane. By executing this processing for all of the color planes, a similar effect to that mentioned above in Embodiment 3 can be acquired.

The depth measurement unit 14 of this embodiment can calculate the depth information using any of the color planes, but the depth is calculated only for a necessary color plane without calculating the depth in all of the pixels for each color plane. Hence, the operation amount can be reduced. Furthermore, the operation amount can also be reduced, since the integration processing for a plurality of distances is unnecessary. As a result, a depth map that is robust in the object color can be generated by an operation amount equivalent to the operation amount to calculate the depth map of one color plane.

Embodiment 5

Figure 9A:
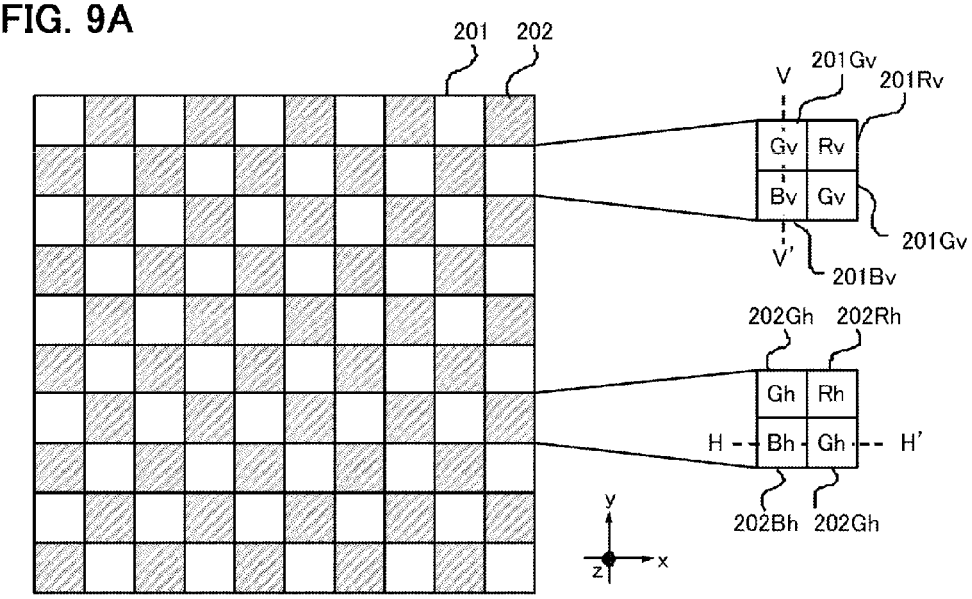
FIG. 9A to FIG. 9C are diagrams depicting an imaging device according to Embodiment 4.
Figure 9B:
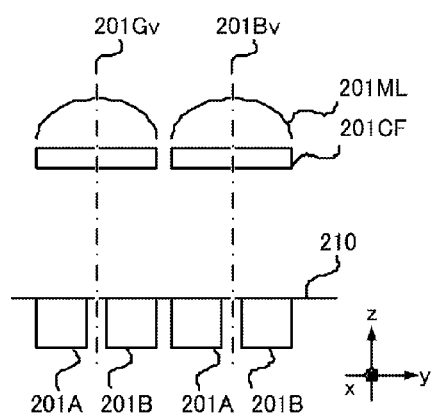
Figure 9C:
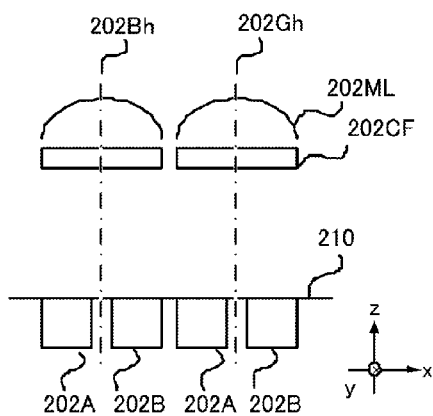

In Embodiment 5 of the present invention, the depth is measured using a phase difference method. Here, an imaging device 11 included in an imaging apparatus 1 according to Embodiment 5 of the present invention will be described first. FIG. 9A to FIG. 9C are diagrams depicting the imaging device. In FIG. 9A, a pixel group 201 and a pixel group 202 are constituted by four pixels in two rows×two columns, respectively. In the pixel group 201, green pixels 201Gv are disposed in the diagonal direction, and a red pixel 201Rv and a blue pixel 201Bv are disposed in the other diagonal direction. In the pixel group 202 as well, green pixels 202Gh are disposed in a diagonal direction, and a red pixel 202Rh and a blue pixel 202Bh are disposed in the other diagonal direction. These two types of pixel groups are arranged on the imaging device 11 in a checkered pattern.

FIG. 9B is a schematic cross-sectional view sectioned at V-V' in the pixel group 201. Reference character 201ML denotes a micro lens, 201CF denotes a color filter, and 201A and 201B denote photoelectric conversion units. FIG. 9C is a schematic cross-sectional view sectioned at H-H' in the pixel group 202. Reference character 202ML denotes a micro lens, 202CF denotes a color filter, and 202A and 202B denote photoelectric conversion units. In FIG. 9B and FIG. 9C, 210 denotes a light receiving surface, and is an xy plane of the photoelectric conversion units on the light entering side (surface on the +z side). FIG. 9B shows the structures of the green pixel 201Gv and the blue pixel By, but the red pixel 201Rv also has the same structure. FIG. 9C shows the structures of the green pixel 202Gh and the blue pixel 202Bh, but the red pixel 202Rh also has the same length as the structure.

In the imaging device 11 of this embodiment, two photoelectric conversion units are disposed in one pixel (such as a green pixel), and the power of the micro lens 201ML and the power of the micro lens 202ML are set such that the light receiving surface 210 and the exit pupil are optically conjugate with each other. By this arrangement, the photoelectric conversion units 201A and 201B (202A and 202B) can receive luminous flux that passes through different EPA and EPB regions of the exit pupil. In the pixel group 201 and the pixel group 202, the positions of the two photoelectric conversion units are ninety degrees rotated from each other. By this configuration, the pixel group 201 and the pixel group 202 can receive the luminous flux that passes through the regions dividing the exit pupil into different directions from each other, using the respective photoelectric conversion units. As a result, the pixel group 201 and the pixel group 202 can detect the object depth for an object, of which contrast change is different, depending on the direction.

Image signals generated from the light received by the two photoelectric conversion units in each pixel group are acquired as an image A and an image B, respectively. The image A and the image B correspond to the first color image and the second color image.

Now, a method of measuring a depth from the generated image A and image B, using a phase difference method, will be described. FIG. 10 is a flow chart depicting a flow of the depth measurement processing using the phase difference method.

In the case of the phase difference method, the defocus amount Def of the object image can be detected by detecting an image shift amount r between the image A and the image B. The image shift amount r is detected by the correlation operation for the image A and the image B (step S121). A known method can be used for the correlation operation, and for example, the correlation value C(k) is calculated by Expression 5, and the image shift amount r is calculated from k when C(k)=0 is established.

[Math. 5]

$$C(k) = \sum_{i=1}^{m-1} |A(i+k+1) - B(i)| - |A(i+k) - B(i+1)| \quad \text{(Expression 5)}$$

Here, A(i) denotes an image signal of the image A, B(i) denotes an image signal of the image B, i denotes a pixel number, and k denotes a relative shift amount between the image A and the image B. Reference character m indicates a target pixel range used for calculating the correlation value C(k).

Then, the defocus amount Def is calculated by substituting the calculated image shift amount r in Expression 6 (step S122).

[Math. 6]

$$Def = \frac{rZ}{w - r} \quad \text{(Expression 6)}$$

Here, w denotes a base line length (interval between the center of the exit pupil EPA and the center of the exit pupil EPB), and Z denotes a distance from the imaging device to the exit pupil.

By executing the same processing for the entire surface of the image A and the image B used for the depth measurement, a depth image based on the defocus amount can be generated. The calculated defocus amount may be converted into a depth to the object using the photographing parameters, whereby the depth image is generated. The image A and the image B used for the depth measurement may be acquired from either one of the pixel group 201 and the pixel group 202. Alternatively, depth may be measured for the image A and the image B acquired from the pixel group 201 and for the image A and image B acquired from the pixel group 202, respectively, so that a depth having a higher confidence coefficient of the depth measurement is selected at each position, and the depth image is generated.

For the confidence coefficient of the depth measurement of this embodiment, a brightness value of each color plane, the presence of texture (confidence coefficient is higher as more texture exists), or a combination thereof can be used.

The depth can be calculated for each color plane by executing the above-mentioned depth measurement method for each color plane of R, G, and B. For the depth information of each color plane, the shift of the calculated depth information, which is generated due to the difference of the focal position in each color plane, is corrected. This correction is performed using the design data of the lens. The depth selection and integration can be performed using the same methods described above with respect to Embodiment 1 to Embodiment 4.

In the example described above, the pixel group 201 and the pixel group 202 have different pupil dividing directions, and the number of pixel groups 201 and the number of pixel groups 202 of the imaging device 11 are the same, but the number of pixel groups 201 and the number of pixel groups 202 may be different, or only one of the pixel groups 201 and pixel groups 202 may be used. Further, in the example described above, a micro lens is used to collect the incident light entering the pixel to the photoelectric conversion unit, but a waveguide, instead of a micro lens, may be used to collect the incident light. Both the micro lens and the waveguide may be used to collect the incident light.

Other Examples

The description of each embodiment is an example used for describing the present invention, and the present invention can be carried out by appropriately changing or combining the above embodiments within a scope that does not depart from the essential spirit of the invention. For example, the present invention may be carried out as an imaging apparatus that includes at least a part of the above processings, or may be carried out as a depth measurement apparatus that does not include the imaging unit. The present invention may be carried out as a depth measurement method, or may be carried out as an image processing program for a depth measurement apparatus to execute this depth measurement method. Each elemental technology of the processing and units described in each embodiment can be freely combined, as long as technical inconsistencies are not generated.

In the description of the embodiments, a case of the imaging apparatus acquiring two images was described as an example, but three or more images may be acquired. In this case, two images are selected from the photographed images to measure the depth. If three or more images are acquired, the range where the depth can be measured becomes wider, and accuracy of the depth improves.

The depth measurement technique of the present invention described above can be suitably applied to an imaging apparatus, such as a digital camera and a digital camcorder, or an image processing apparatus and a computer that perform image processing on image data acquired by an imaging apparatus. The present invention can also be applied to various electronic apparatuses (including a portable telephone, a smartphone, a slate type terminal, and a personal computer) that includes such an imaging apparatus or an image processing apparatus.

In the description of the embodiments, a configuration incorporating the depth measurement function into the imaging apparatus main unit was shown, but the depth may be measured by an apparatus other than the imaging apparatus. For example, the depth measurement function may be included in a computer having an imaging apparatus, so that the computer acquires an image photographed by the imaging apparatus and calculates the depth. The depth measurement function may be included in a computer that can access a network via cable or radio, so that this computer acquires a plurality of images via the network and measures the depth.

The acquired depth information can be used for various image processings, such as dividing the region of the image, generating a three-dimensional image or a depth image, and emulating the blur effect.

OTHER EMBODIMENTS

The present invention can also be implemented by supplying a program, which implements one or more functions of the above embodiments, to a system or an apparatus via a network or a recording medium, and allowing one or more processors of the computer of the system or the apparatus to read and to execute the program. Furthermore, the present invention can also be implemented by a circuit (e.g., an application specific integrated circuit (ASIC)) that implements one or more functions.

For this purpose, the above-mentioned program is supplied to the computer via a network or from various types of recording media that can be the storage apparatus (in other words, a computer-readable recording medium that holds data non-temporarily). Therefore, the above-mentioned computer (including such a device as a CPU and an MPU), the above-mentioned method, the above-mentioned program (including program codes and program products) and the above-mentioned computer-readable recording medium that holds the program non-temporarily are all included in the scope of the present invention.

Embodiment(s) of the present invention can also be realized by a computer of a system or an apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., an application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., a central processing unit (CPU), or a micro processing unit (MPU)) and may include a network of separate computers or separate processors to read out and to execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), a digital versatile disc (DVD), or a Blu-ray Disc (BD)™) a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. A depth measurement apparatus that calculates depth information of an object based on a first color image and a second color image, the apparatus comprising:
at least one processor operatively coupled to a memory, serving as:
(A) a depth calculator adapted to calculate depth information of a target pixel in a color plane, using the two color images; and
(B) an evaluator adapted to calculate, for each color plane, an evaluation value to indicate a confidence coefficient of the depth information in the target pixel,
wherein the depth calculator (i) is further adapted to determine, based on the evaluation value, a color plane from which the depth information of the target pixel is calculated, (ii) calculates a correlation value in one color plane between the two color images, and calculates the depth information from the correlation value using a conversion table or a conversion formula that is different for each color plane, and (iii) calculates the depth information of the target pixel using a color plane of which a correlation value is a threshold or less.

2. The depth measurement apparatus according to claim 1, wherein the evaluator is further adapted to calculate the evaluation value of the color plane in the target pixel as a brightness value in the target pixel or an average value of brightness values in a peripheral region of the target pixel, in the color plane of one of the two color images, or an image acquired by combining these two color images.

3. The depth measurement apparatus according to claim 1, wherein the evaluator is further adapted to calculate the evaluation value of the color plane in the target pixel as the number of pixels satisfying a condition that a brightness value in a peripheral region of the target pixel is a predetermined threshold or more, in the color plane of one of the two color images, or an image acquired by combining these two color images.

4. The depth measurement apparatus according to claim 1, wherein the depth calculator is further adapted to calculate the depth information of the target pixel using a color plane having the highest evaluation value.

5. The depth measurement apparatus according to claim 1, wherein the depth calculator is further adapted to calculate a plurality of depth information for each of a plurality of pixels using each color plane, and to select, for each pixel, depth information acquired using a color plane having the highest evaluation value, as the depth information of this pixel.

6. The depth measurement apparatus according to claim 1, wherein the depth calculator is further adapted to select, for each pixel, a color plane having the highest evaluation value, and to calculate the depth information using the selected color plane.

7. The depth measurement apparatus according to claim 1, wherein the depth calculator is further adapted to calculate the depth information based on a difference of a phase difference in each color plane between the two color images.

8. An imaging apparatus comprising:
   at least one processor operatively coupled to a memory, serving as:
   (A) an imaging optical system;
   (B) an imaging device that acquires a color image constituted by a plurality of color planes; and
   (C) a depth measurement apparatus comprising:
      (a)) a depth calculator adapted to calculate depth information of a target pixel in a color plane, using the two color images; and
      (b) an evaluator adapted to calculate, for each color plane, an evaluation value to indicate a confidence coefficient of the depth information in the target pixel,
   wherein the depth calculator (i) is further adapted to determine, based on the evaluation value, a color plane from which the depth information of the target pixel is calculated, (ii) calculates a correlation value in one color plane between the two color images, and calculates the depth information from the correlation value using a conversion table or a conversion formula that is different for each color plane, and (iii) calculates the depth information of the target pixel using a color plane of which a correlation value is a threshold or less.

9. A depth measurement method executed by a depth measurement apparatus that calculates depth information of an object based on a first color image and a second color image, the method comprising:

an evaluation value calculation step of calculating, for each color plane, an evaluation value to indicate a confidence coefficient of the depth information in a target pixel; and
a depth calculation step of calculating the depth information of the target pixel using the depth information acquired from a color plane that is determined based on the evaluation value,
wherein, in the depth calculation step, (i) a correlation value in one color plane between the two color images is calculated, and the depth information is calculated from the correlation value using a conversion table or a conversion formula that is different for each color plane, and (ii) the depth information of the target pixel is calculated using a color plane of which a correlation value is a threshold or less.

10. The depth measurement method according to claim 9, wherein, in the evaluation value calculation step, the evaluation value of the color plane in the target pixel is calculated as a brightness value in the target pixel or an average value of brightness values in a peripheral region of the target pixel, in the color plane of one of the two color images, or an image acquired by combining these two color images.

11. The depth measurement method according to claim 9, wherein, in the evaluation value calculation step, the evaluation value of a color plane in the target pixel is calculated as the number of pixels of which a brightness value in a peripheral region of the target pixel is a predetermined threshold or more, in the color plane of one of the two color images, or an image acquired by combining these two color images.

12. The depth measurement method according to claim 9, wherein, in the depth calculation step, the depth information of the target pixel is calculated using a color plane having the highest evaluation value.

13. The depth measurement method according to claim 9, wherein the evaluation value is calculated for a plurality of pixels in the evaluation value calculation step, and the depth calculation step includes:
   (i) a step of calculating a plurality of depth information for each of the plurality of pixels using each color plane; and
   (ii) a step of selecting, for each pixel, depth information acquired using a color plane determined based on the evaluation value, as the depth information of this pixel.

14. The depth measurement method according to claim 9, wherein the evaluation value is calculated for a plurality of pixels in the evaluation value calculation step, and, in the depth calculation step and for each pixel, the depth information of this pixel is calculated using a color plane determined based on the evaluation value.

15. A non-transitory computer-readable storage medium storing a program for causing a computer to execute a depth measurement method of calculating depth information of an object based on a first color image and a second color image, the method comprising:
an evaluation value calculation step of calculating, for each color plane, an evaluation value to indicate a confidence coefficient of the depth information in a target pixel; and
a depth calculation step of calculating the depth information of the target pixel using the depth information acquired from a color plane that is determined based on the evaluation value, wherein, in the depth calculation step, (i) a correlation value in one color plane between the two color images is calculated, and the depth information is calculated from the correlation value using a conversion table or a conversion formula that is different for each color plane, and (ii) the depth information of the target pixel is calculated using a color plane of which a correlation value is a threshold or less.

16. A depth measurement apparatus that calculates depth information of an object based on a first color image and a second color image, the apparatus comprising:
- at least one processor operatively coupled to a memory, serving as:
- (A) a depth calculator adapted to calculate depth information of a target pixel in a color plane, using the two color images; and
- (B) an evaluator adapted to calculate, for each color plane, an evaluation value to indicate a confidence coefficient of the depth information in the target pixel,
- wherein the depth calculator (i) is further adapted to determine, based on the evaluation value, a color plane from which the depth information of the target pixel is calculated, and (ii) calculates a value generated by determining a weighted average of the depth information acquired using respective color planes according to the evaluation value, as the depth information of the target pixel, the weighted average being determined using only the depth information in which the number of depth values having the same sign with respect to a focus position is high, out of the depth information acquired using respective color planes.

17. An imaging apparatus comprising:
- (A) an imaging optical system;
- (B) an imaging device that acquires a color image constituted by a plurality of color planes; and
- (C) a depth measurement apparatus comprising:
  - (a) a depth calculator adapted to calculate depth information of a target pixel in a color plane, using the two color images; and
  - (b) an evaluator adapted to calculate, for each color plane, an evaluation value to indicate a confidence coefficient of the depth information in the target pixel,
  - wherein the depth calculator (i) is further adapted to determine, based on the evaluation value, a color plane from which the depth information of the target pixel is calculated, and (ii) calculates a value generated by determining a weighted average of the depth information acquired using respective color planes according to the evaluation value, as the depth information of the target pixel, the weighted average being determined using only the depth information in which the number of depth values having the same sign with respect to a focus position is high, out of the depth information acquired using respective color planes.

18. A depth measurement method executed by a depth measurement apparatus that calculates depth information of an object based on a first color image and a second color image, the method comprising:
- an evaluation value calculation step of calculating, for each color plane, an evaluation value to indicate a confidence coefficient of the depth information in a target pixel; and
- a depth calculation step of calculating the depth information of the target pixel using the depth information acquired from a color plane that is determined based on the evaluation value, wherein, in the depth calculation step, (i) a value generated by determining a weighted average of the depth information acquired using respective color planes according to the evaluation value is calculated as the depth information of the target pixel, and (ii) the weighted average is determined using only the depth information in which the number of depth values having the same sign with respect to a focus position is high, out of the depth information acquired using respective color planes.

19. A non-transitory computer-readable storage medium storing a program for causing a computer to execute a depth measurement method of calculating depth information of an object based on a first color image and a second color image, the method comprising:
- an evaluation value calculation step of calculating, for each color plane, an evaluation value to indicate a confidence coefficient of the depth information in a target pixel; and
- a depth calculation step of calculating the depth information of the target pixel using the depth information acquired from a color plane that is determined based on the evaluation value, wherein, in the depth calculation step, (i) a value generated by determining a weighted average of the depth information acquired using respective color planes according to the evaluation value is calculated as the depth information of the target pixel, and (ii) the weighted average is determined using only the depth information in which the number of depth values having the same sign with respect to a focus position is high, out of the depth information acquired using respective color planes.

* * * * *